UNITED STATES PATENT OFFICE 2,282,364

STARCH ADHESIVE COMPOSITION

Walter G. Kunze and Raymond B. Evans, Catonsville, Md., assignors to Le Page's Inc., Gloucester, Mass., a corporation of Massachusetts No Drawing. Application October 23, 1940, Serial No. 362,419

9 Claims. (Cl. 106—210)

This invention relates to a starch adhesive composition and more particularly to one containing an activator for the starch adhesive, that is, an agent serving to impart thereto such characteristics as desired wet-tackiness and mobility or fluidity for a substantial period of time while detracting very little, if at all, from the capability of the dried or set adhesive film to withstand abnormally humid atmospheres.

In preparing starch adhesive compositions for various purposes, including uses in which the dried starch composition or film is reactivated by moistening treatment, it is sometimes the practice to incorporate into the starch suitable adhesive-activators, which, when the starch composition is cooked up as usual in aqueous media, function to maintain the composition in the desired adhesively active state and useful fluency. Urea has been found commercially attractive for such purpose for the reasons that, besides obviating undesirable "pasting" or "setting up" tendency in the cooked starch composition, it imparts good wet-tack properties to the composition, also good reactivating capability thereto on moistening treatment, and attractive gloss to the dried film of composition reminiscent of that exhibited by an animal glue film. However, the use of urea presents some serious disadvantages. Thus, when urea is used in relatively large amount, such as may be necessary for activating to the desired extent certain starch-conversion products, such as so-called white dextrines, it may, on account of its high hygroscopicity, impart so much of this same quality to the dried film of adhesive composition that the latter will tend to become undesirably tacky, especially when exposed to such highly humid atmosphere as sometimes prevails in the summertime. Again, in order to realize sufficient activating effect from urea on practically all kinds of starches and their conversion products, it is generally necessary to use the urea in amounts upwards of 5%, based on the weight of the starch; and the amount, sometimes as high as 50%, based on the weight of the starch, is seriously detractive of such strength and other desirable qualities as are potentially realizable from the starch composition in the absence of urea. The use of urea thus always presents the problem of permitting the realization of sufficient of its advantages to offset such disadvantages as are inevitably presented thereby. Even in the case of so-called yellow dextrines, in connection with which a relatively small amount of urea activator may serve its intended purpose, one is apt to encounter the trouble of undesirable boosting or deepening of the yellow, amber, and red tinge of the dextrine, probably as a result of some color reaction between the urea or its products of decomposition and the coloration or color-forming substances present in such dextrine.

We have discovered that dicyandiamide, hereinafter for convenience of designation termed "Dicy," may be used to surprisingly good advantage as an activator in starch adhesive compositions of both directly-used and remoistening varieties. In speaking about a directly-used starch composition, we mean a composition that is applied and serves at once as an adhesive, as between sheets of paper, plies of wood, etc.; and, in speaking about a remoistening starch composition, we mean a composition that is applied and dried on the work or surface in film form and is then reactivated by moistening treatment for bonding or union with another material or surface. This surprising utility of "Dicy" is attributable more particularly to its far greater potency as an activator than urea and, accordingly, its usefulness in much smaller amount than urea to accomplish a given activating effect; also to its substantial non-hygroscopicity, in consequence of which it does not tend to impart to dried starch films containing it the property of spontaneously acquired tackiness upon exposure to highly humid atmospheric conditions; and further to its relatively high stability, it being wholly stable up to about 80° C., which is practically no higher than such temperature as is often commercially used in cooking up starch compositions, and decomposing only very slowly at temperatures above 80° C. In speaking about the stability of "Dicy," we have reference, of course, to its stability in dissolved or solution form. Despite the fact that "Dicy" is under present market conditions considerably more expensive on a poundage basis than urea, its starch-activating potency is so much greater than urea and it otherwise affords such advantages over urea that we have found it highly desirable commercially in many instances to use "Dicy" in lieu of urea as an activator in starch adhesive compositions.

We shall now indicate in terms of particular examples of procedure the remarkable effect of "Dicy" in preserving the adhesive activity and liquidity of a typical dextrine of high body such as is now being sold commercially under the trade designation "No. 54" by Healey, Seaver Company of Dorchester, Massachusetts, for such purposes as gumming the sealing flaps of envelopes and for other gumming or sealing purposes requiring strong gumming action. In such case and generally in all cases when liquid gums of high concentration are being made, as when the dextrine by itself is cooked up in the proportion of 2.5 parts of dextrine by weight to 1 part of water, it is found that the resulting cooked dextrine composition thickens at a considerable rate, exhibiting a viscosity increase amounting to about 140% in ten days. By adding to such dextrine preparatory to its cooking as little as 0.2% "Dicy," based on the dry weight of dextrine, the viscosity increase was markedly suppressed, as shown by a viscosity-increase value of about 100% in the ten-day period. By increasing the amount of "Dicy" to 0.5%, based on the dry weight of dextrine, increase in viscosity of the cooked compoistion was held down to only about 60% in a ten-day test period; and the addition of 1% "Dicy," based on the dry weight of dextrine, kept the viscosity increase at a value of as low as about 25% in a ten-day test period. Indeed, it is possible to preserve over a long period in such a dextrine composition the desired fluid-stability or mobility by adding thereto "Dicy" in amount up to practically the limit of its solubility in water at various starch solids-to-water ratios in the composition, but such later amount is, in actual practice, unnecessary, since the addition of no more than about 0.5% to 1% of "Dicy" to dextrinized starches may well suffice to impart thereto sufficeint stability to enable them to fulfill commercial requirements, including ability to be stored for many days without undergoing such increase in viscosity as militates against their satisfactory use in automatic sealing machines, for instance, those used for envelope fabrication, sealing of cartons, and the like.

By virtue of the stability up to about 80° C. of "Dicy" and its low rate of decomposition even at somewhat higher temperatures, it is possible to prepare commercially satisfactory, activated, starch compositions without the addition of extraneous acids or acidic reagents. This is in contradistinction to what has been found to be the case in urea-activated starch compositions, in which case it has sometimes been found commercially desirable to add to the compositions suitable acidic reagents and more especially such relatively expensive organic acids as tartaric and citric for the purpose of combining with the ammonia liberated by decomposition of the urea during the cooking of the composition and/or when dried films of the compositions are exposed to abnormal heat for a period of time. Were an acidic reagent omitted, it is found that the ammonia thus liberated tends to throw the composition on the alkaline side with attendant likelihood of discoloring or damaging some surfaces, especially paper and metal foil surfaces, to which the composition is applied. It is thus seen that the starch compositions hereof containing "Dicy" as an activator may be desirably free from acidic reagents, which may eventually also tend to discolor or otherwise injure the surfaces with which the composition contacts, and thus for certain purposes be superior to the acid-containing, urea-activated starch compositions of the prior art. The "Dicy"-activated compositions hereof are also freer from the foaming or effervescing problem presented in the cooking of a urea-activated starch composition which, because of liberation of gas during the decomposition of the urea, may froth badly or even boil over and thus result in much nuisance and loss of material.

The value of "Dicy" as an activator for starch compositions comes all the more to the fore in those instances when the starch compositions are used hot, for instance, when starch compositions are applied to paper, cloth, or other bases to produce various gummed or coated products intended to be reactivated by moisture, such as sealing tape, and/or when they are directly-used adhesives, as between plies of paper, wood veneer, the paper convolutions or windings of tubes, etc. In such instances, it is possible to use the "Dicy" in the hot starch composition in relatively large amount, for "Dicy" is much more soluble in hot water than in cold water. Assuming, therefore, that one desires to produce a sealing tape or the like of especially good remoistening activity, it is possible to incorporate into the hot aqueous starch composition for such tape an amount of "Dicy" in excess of that soluble in the aqueous starch composition at room temperature, say, an amount of "Dicy" as high as 25% concentration in water. Indeed, it is theoretically possible to use in such starch composition an amount of "Dicy" up to the very limit of its solubility in water at, say, 80° to 100° C., the temperature at which such starch composition is cooked or prepared. To be sure, when the hot aqueous starch solution is applied to the sheet of paper or other base to be coated and permitted to cool and set in film form, there may be tendency for the "Dicy" to precipitate or crystallize in the film of composition, but the crystals can be generated as ultra-fine or microscopic particles by appropriate control or regulation of the drying or setting temperatures. In any event, even though there may be present in the resulting dried film of starch composition an amount of "Dicy" far in excess of that to be dissolved by such moisture or water as is used in reactivating the dried film, yet such excess may do no serious harm, for it is substantially non-hygroscopic and may be present in the form of such fine crystals as to have no serious effect in disrupting the continuity of the film to be reactivated. The fact is that such excess of "Dicy" in a film to be moisture-reactivated may be advantageous in that it may enable reactivation to take place practically instantaneously, owing to its solution in the reactivating moisture to form practically instantaneously a reactivating solution of practically maximum saturation and activating potency. When using "Dicy," accordant with the present invention, as the adhesive activator in starch compositions to be moisture-reactivated, it thus becomes possible to use in such compositions starch-conversion products of relatively low dextrine content and/or relatively low solubilities heretofore useful, if at all, only with difficulty. Starch films of low dextrine content and/or of low solubility have potentially high adhesive strength or bonding power, but they are resistant or slow to activation when they are deposited from compositions prepared by cooking up the starch with plain water. By compounding or cooking up such starches in water with suitable amounts of "Dicy," it is possible to realize dried films of substantially instaneously reactivatable character, i. e., films which, upon being remoistened, acquire tackiness with sufficient speed or promptness to be of such great commercial value as to supplant, with significant economy and technical advantages, various adhesives, even including animal glue, for a wide variety of purposes. This has been found true in the case of starch-conversion products of a dextrine content as low as about 5% to about 50% and/or of a solubility ranging from about 10% to substantially 100%, which starch-conversion products are especially valuable for sealing tapes and like products designed to be moisture-reactivated, for such products are of inherently high dry-bonding tenacity and, in accordance with the present invention, are rendered quickly activatable and of high wet-tackiness or wet-strength. This has also been found true of these same starch-conversion products when they are to be applied as directly-used adhesive compositions. It is to be understood that not only does "Dicy" function advantageously as an activator in the most exacting field of starch-conversion products, namely, those of low dextrine content and high solubility or low solubility, but that it is also applicable, in accordance with the present invention, as an adhesive-activator to the entire range of starches and starch-conversion products, including even raw starches and starches of the very highest dextrine contents and/or solubilities.

It might be noted that the dextrine-maker has heretofore been obliged in producing dextrines of high dextrine content and/or solubilities to conduct the calcination or dextrinizing treatment of starch under such controlled time and/or temperature conditions as to ensure the realization of the specified end-point of dextrine content and/or solubility. In striving for this attainment, it is frequently the case that the dextrine-maker overshoots the desired end-points, as by somewhat overheating or over-treating the starch, thereby ensuring the fulfillment of specification. When these end-points are thus over-shot, undesirable degradation products, usually measured in terms of their reducing power on a Fehling solution, generally creep into the product, sometimes in amount of 2% to 5%. It has been found that "Dicy" has such adhesive-activating potency as to enable the dextrine-maker to prepare his dextrine products with much greater leeway than heretofore, insomuch that even though he may not during calcination or dextrinizing treatment reach a particular end-point of dextrine content and/or of solubility sought by him, nevertheless, he is able to compensate for such failure by compounding the resulting dextrine or starch-conversion product with a suitable amount of the "Dicy." In short, the dextrine-maker may, by compounding his dextrine product with "Dicy," prepare his dextrine or starch-conversion product to the desired definite end-point or even short of such end-point of dextrine content and/or solubility and yet, by the present invention, realize in his finished starch adhesive composition all those desirable properties, including high tackiness, substantial viscosity stability, high ultimate or dry-bonding power, etc., while at the same time avoiding the presence in the finished composition of those degradation products classified as reducing substances.

The "Dicy" present in starch compositions, pursuant to the present invention, thus serves one or more such vital functions as to:

(a) Impart in general to starch adhesive compositions and starch-conversion products a quality of relatively high tackiness, stringiness, or tenacity of wet-grab characteristic of animal glues and of borated starches or dextrines, which latter may, however, suffer from the fault of requiring unduly high water dilution for use and/or yielding films of inadequate ultimate dry-bonding power. The "Dicy"-containing compositions hereof are also importantly superior to such urea-compounded starch adhesive compositions or starch-conversion products as tend to yield films of noticeably slimy or greasy character, i. e., of relatively inferior tenacity of wet-grab, especially when such films are dried and are reactivated by no more than plain water, as is usually desired.

(b) Impart to dried amylaceous films that would otherwise be substantially inert or inactive on remoistening treatment extremely high and rapid adhesive activation, whereby said films can serve advantageously on sealing tapes or other gummed products designed to be adhesively activated by moistening treatment with water.

(c) Modify to such an extent the fluid-stability of aqueous starch compositions, particularly those of relatively high starch solids content, that compositions otherwise tending to "paste" or "set up" in comparatively short order (e. g., immediately on cooling or after standing for 24 hours or longer) are rendered indefinitely mobile or sufficiently liquid to lend themselves to shipment, long-time storage, and such other contingencies as would render inutile similar compositions lacking the "Dicy."

In respect of this last-named role played by "Dicy" in starch compositions, it might be noted that there are many starch-conversion products now on the market that, because of relatively small dextrine content, are seriously faulty as regards their tendency to "paste up." Among such starch products may be mentioned the starch-conversion product sold under the trade designation "5218 Base" dextrine by Healey, Seaver Company of Dorchester, Massachusetts; also the starch-conversion products sold under the trade designations "6M," "8M," and "10M" dextrines by Victor G. Bloede Co., Baltimore, Maryland. When "Dicy" in amounts ranging from 0.1% to 5%, based on the dry weight of starch solids, is compounded with any one or a mixture of these starch-conversion products that would otherwise tend to "paste up" when cooked up with plain water and allowed to stand, particularly in relatively concentrated form, say a solids-to-water ratio ranging from 2.5:1 to 1:1, it is found that the resulting cooled aqueous starch compositions at such solids concentration retain their fluidity and mobility indefinitely or sufficiently long to lend themselves nicely to storage and shipment; and the specific amount of "Dicy" thus compounded may be controlled to yield a finished or cooled aqueous starch composition of predetermined and/or reproducible fluency or liquidity especially adapted for the particular use to which it is to be put.

It is thus possible accordant with the present invention to prepare for shipment and storage liquid aqueous starch compositions that stand up indefinitely or for a sufficiently long period of time to render them useful even in instances when starch compositions from the same similarly prepared starch base and water but in absence of the "Dicy" would be very troublesome on account of their "pasting" tendency; so much so as ultimately to serve no useful purpose whatsoever. Of course, the "Dicy"-containing compositions hereof may be shipped in solid or dry form to the user, that is, as a substantially physically homogeneous mixture of the starch granules or pulverulent starch-conversion product with the appropriate amount of crystalline "Dicy,"

in which case the user may proceed to cook up the mixture or compound with a suitable amount of water in such proportions as have already been mentioned or in any other suitable proportions.

In some instances, it may be advantageous to compound starch compositions with "Dicy" and other agents having particular effects, such as plasticizing and/or thickening effects, thereon. Thus, the starch compositions hereof containing "Dicy" may be compounded with various plasticizing agents, such as glycerine, ethylene glycol, and other polyhydric alcohols or their equivalents. It is especially advantageous, in accordance with the present invention, to compound aqueous starch compositions with both "Dicy" and a solid or waxy plasticizer consisting of a polymer of ethylene glycol or other polyolefine glycols and sold on the market under the trade-mark "Carbowax," for such particular plasticizer is available in substantially non-hygroscopic form and, together with the "Dicy," affords a starch composition which in dried film form is characterized by its substantial lack of hygroscopicity. Only a small percentage of the "Carbowax," say, not more than about 2%, based on the starch solids content of a starch composition, makes for a starch film of highly pliant or flexible properties, that is, a film which may be sharply flexed, as on a tape or flat goods, while maintaining its substantial continuity or freedom from cracks and checks. Such small percentage of "Carbowax" together with a relatively small percentage, say, not more than about 5% of "Dicy," based on the weight of starch solids in a starch composition, makes possible the realization of dried films of starch composition, as on sealing tape, having high integrity or tensile strength and the desired flatness or "non-curling" quality. These advantages also apply when such composition is used for purposes other than tape, say, for bonding together plies of paper, wood, etc., since the dried film of the starch composition hereof containing both the "Carbowax" and the "Dicy" is of relatively very low friability.

In general, certain salt radicals, such as the phosphates, sulphates, and borates, are known to cause marked thickening or increase in viscosity when added to most aqueous starch compositions, especially at relatively high starch solids content. The addition of such salts having a thickening action to aqueous starch compositions is sometimes desirable for the reason that they tend to modify the state of dispersion of the starch particles, wherefore, the compositions may be rendered more selectively or strongly adhesive to particular surfaces or substances. It is sometimes advantageous to effect through such salts a modification of the state of dispersion of aqueous starch compositions while at the same time minimizing or offsetting completely the thickening effect of such salts. It has been found that "Dicy" is particularly valuable not only as an adhesive-activator but also as a counteractant or neutralizer for the usual marked viscosity-increasing or thickening effect of various salts, insomuch that, whereas some of these salts would cause aqueous starch compositions to "paste up" and/or become heavy-bodied or thick in comparatively short order when used in substantial amount, they are greatly suppressed or practically neutralized in this regard by the use of an appropriate amount of "Dicy." Specifically, one may desire an aqueous starch composition having good adhesive affinity for such materials as paper, boards, etc. and hence put on the alkaline side to acquire such affinity, as by disodium phosphate or sodium borate. In such case, one may start typically with a starch-conversion product available on the market under the trade designation "No. 54" dextrine, which is currently being sold by Healey, Seaver Company of Dorchester, Massachusetts and Victor G. Bloede Company of Baltimore, Maryland, and which normally has a dextrine content downwards of about 70% and a solubility upwards of about 90%. When such a dextrine is cooked up at the usual temperatures, say 70° to 80° C., with a dextrine-to-water ratio ranging from about 1:1 to about 2:1 in the presence of about 1% disodium phosphate or about 7% to 10% borax, based on dry dextrine solids, a composition of both the desired selective adhesive affinity and fineness of dispersion is realized at the desired relatively high dextrine content. However, the resulting composition lacks the desired fluency or mobility and the phosphate-containing composition tends to "paste up." By adding to such composition as it is being prepared about 5% of "Dicy," based on the dry starch solids, it is possible to arrive at a finished starch composition of the appropriate fluid-stability in the case of both the phosphate-containing and the borate-containing compositions.

It is possible to prepare other compositions, in accordance with the present invention, wherein the "Dicy" is present along with other compounding or modifying agents, such as borax, sodium carbonate, the acetates, the various carboxylic acids and the salts thereof, and even such other adhesive-activators as urea and the homologues and analogues thereof. Indeed, the "Dicy"-containing starch compositions hereof may be compounded with the various compounding or modifying agents known in the starch-adhesive industry, among which may be mentioned the water-soluble halide salts, such as sodium chloride, which are known to improve the smooth-spreading properties of aqueous starch compositions. The fact that "Dicy" is present in these variously compounded starch compositions means that the user is enabled to prepare aqueous starch compositions of the desired fluency or spreadability at relatively high starch solids content and, accordingly, with the formation in a single spreading operation of a film having the desired body, bonding-tenacity, film structure, etc.

The "Dicy"-containing starch composition hereof is useful for widely miscellaneous purposes, including, for example, the various uses to which animal glues are sometimes put and many other uses for which animal glue is unsatisfactory. Typical of the many uses may be mentioned its adaptability as a binder for paper box manufacture and for the windings or plies of spirally wound and convoluted paper tubes; the adhesive composition or paste for wall papers, in which case it may serve as a directly applied or a moisture-reactivatable composition; sealing tape, in which case it may function advantageously in lieu of animal glue or animal-glue-substitution products; as the gum on the sealing flaps of envelopes as well as in the back seams; as the dried gum on label stock or other flat-gummed paper to be reactivated with moisture; as a directly applied gum or a moisture-reactivatable gum on posters and billboards; as an adhesive or binder for the plies of multi-ply paper products, corrugated paper products, etc.; as a so-called surface size or beater size for paper products, in which latter case it may be added in bulk condition to papermaking stock in the beater engine or at other suitable stage of paper fabrication; for the purpose of plying or bonding sheets of paper, wood veneer, glass, various artificial films or foils; and sundry other purposes.

The term "starch," as used in the foregoing description and in the appended claims, should be construed comprehensively to mean starches or amylaceous materials of various origins (e. g., tapioca, potato, corn, etc.) in various stages or degrees of modification or conversion (e. g., raw or native starches, calcined white and yellow dextrines, both partly and completely dextrinized, chemically treated or degenerated starches, including acid-treated, alkali-treated, oxidant-treated, and diastase and other enzyme-treated starches), and having various solubilities all the way from a completely insoluble starch to a completely soluble one.

The dextrine content as given in the foregoing description and in the appended claims for the starch-conversion-product is determined by the method of Babington, Tingle, and Watson, as described under the caption "The Examination of Commercial Dextrine and Related Starches" in the Journal of the Society of Chemical Industry, vol. 37 (1918), p. 257. The cold-water-solubility as given in the foregoing description and in the appended claims for the starch-conversion-product is determined by adding 5 parts of such product in bone-dry condition to 100 parts of water at 75° F., mixing such product in the water for not less than about 3 hours, at the end of which time the dissolution of the soluble solids is ensured, and then filtering the resulting aqueous suspension through filter paper of sufficient thickness and pore-fineness to ensure efflux of a substantially clear filtrate. Thus, a high grade "Swedish" filter paper, such as is ordinarily used for analytical laboratory work, may serve in making our test for cold-water-solubility. The filter paper carrying the undissolved accumulation or starch-conversion-product residue is dried, at, say 230° F., to bone-dryness and weighed. The undissolved starch residue may then be readily calculated from the original or bone-dry weight of the filter paper and the percentage of the soluble and insoluble solids in the starch-conversion-product readily evaluated.

We claim:
1. An adhesive composition comprising starch and dicyandiamide.
2. An adhesive composition comprising a starch-conversion product and dicyandiamide, said starch-conversion product having a dextrine content ranging from about 5% to about 50%.
3. An adhesive composition comprising starch and dicyandiamide in amount of about 0.1% to about 5%, based on the weight of the starch.
4. An adhesive composition comprising starch, dicyandiamide, and a plasticizer in the form of polyolefine glycol.
5. An adhesive composition comprising starch, dicyandiamide in amount not more than about 5% by weight of the starch, and polyolefine glycol in amount not more than about 2% by weight of the starch.
6. An aqueous adhesive composition comprising starch, a salt normally capable of thickening said composition, and sufficient dicyandiamide to suppress markedly the normal thickening effect of said salt on said composition.
7. An aqueous adhesive composition comprising a starch-conversion product normally tending to "paste up" when prepared with plain water and allowed to stand but transformed under similar conditions of treatment to substantial fluid-stability by the presence therein of dicyandiamide.
8. An aqueous adhesive composition comprising a starch-conversion product normally tending to "paste up" when prepared with plain water and allowed to stand but transformed under similar conditions of treatment to substantial fluid-stability by the presence therein of dicyandiamide in the amount of about 0.1% to about 5%, based on the weight of said starch-conversion product.
9. An aqueous adhesive composition comprising a starch-conversion product normally tending to "paste up" when prepared with plain water at a solids-to-water ratio ranging from 2.5:1 to 1:1 and allowed to stand but transformed under similar conditions of treatment to substantial fluid-stability by the presence therein of dicyandiamide in amount up to practically the limit of its solubility in the aqueous component of said composition.

WALTER G. KUNZE.
RAYMOND B. EVANS.